May 13, 1952     F. WALLER     2,596,746
PANORAMIC CAMERA WITH STATIONARY FILM
Filed July 12, 1949     4 Sheets-Sheet 1

FIG.I.

INVENTOR
Fred Waller
BY Emery Varney,
Whittemore & Pim
ATTORNEY

May 13, 1952 F. WALLER 2,596,746
PANORAMIC CAMERA WITH STATIONARY FILM
Filed July 12, 1949 4 Sheets-Sheet 3

INVENTOR
Fred Waller
BY
ATTORNEY

May 13, 1952  F. WALLER  2,596,746
PANORAMIC CAMERA WITH STATIONARY FILM
Filed July 12, 1949  4 Sheets-Sheet 4

INVENTOR
Fred Waller
BY Emery Varney,
Whittemore & Dix
ATTORNEY

Patented May 13, 1952

2,596,746

UNITED STATES PATENT OFFICE 2,596,746

PANORAMIC CAMERA WITH STATIONARY FILM

Fred Waller, Huntington, N. Y., assignor to The Vitarama Corporation, Huntington Station, N. Y., a corporation of New York Application July 12, 1949, Serial No. 104,262

9 Claims. (Cl. 95—16)

1

This invention relates to cameras for taking panoramic pictures through any desired angle without requiring compensating devices for eliminating the motion of the image on the film.

In cameras that are used for taking panoramas by rotating the camera through an angle during the exposure period, it has been necessary to move the film, or reverse the pictures or in some other way to compensate for movement of the image in space.

It is an object of this invention to provide an improved panoramic camera having unique features which make the image remain stationary in space while the camera rotates. With this invention a wider film gate can be used because of the stationary image and the position of the portion of the film that is being exposed.

One feature of the invention relates to the mounting of the lens for rotation about its second principal point during the angular movement of the camera. This makes the image formed at the film gate remain fixed in space so that there is no relative movement of the image with respect to a film which is held stationary at a film gate located at the focal plane of the lens.

Another feature of the invention is the provision of a cylindrical frame which gives the film a cylindrical shape at the region of the film gate. By bending the film into such a shape, vertical lines record the same length on the film for each position of the lens and film gate during the exposure sequence. Consequently there is no progressive smearing of the image outward from the center line of the picture.

Other objects, features and advantages of the invention will appear or be pointed out as the description proceeds.

In the drawing, forming a part hereof, in which like reference characters indicate corresponding parts in all the views, Figure 1 is a perspective view of a panoramic camera embodying this invention.

Figure 1:
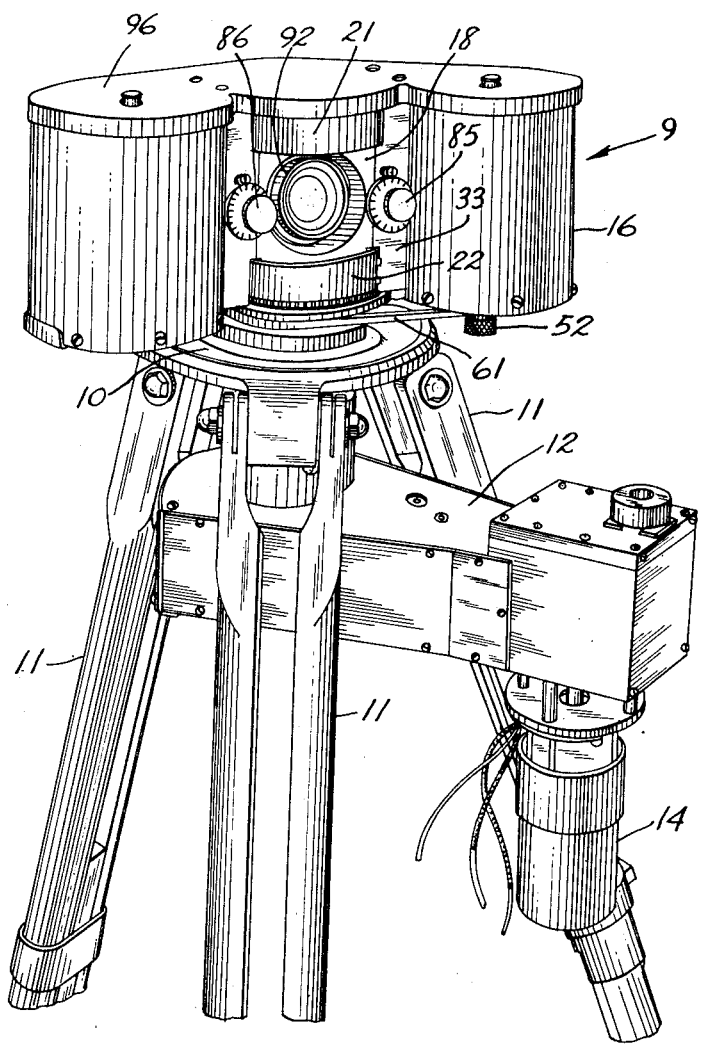

Figure 1 shows a camera 9 mounted on a head 10 of a tripod 11. The housing of the camera is rotatable with respect to the tripod about a fixed cylinder which connects the camera with the tripod and the construction of which will be explained in connection with subsequent figures of the drawing. The axis of rotation of the camera

Figure 3:
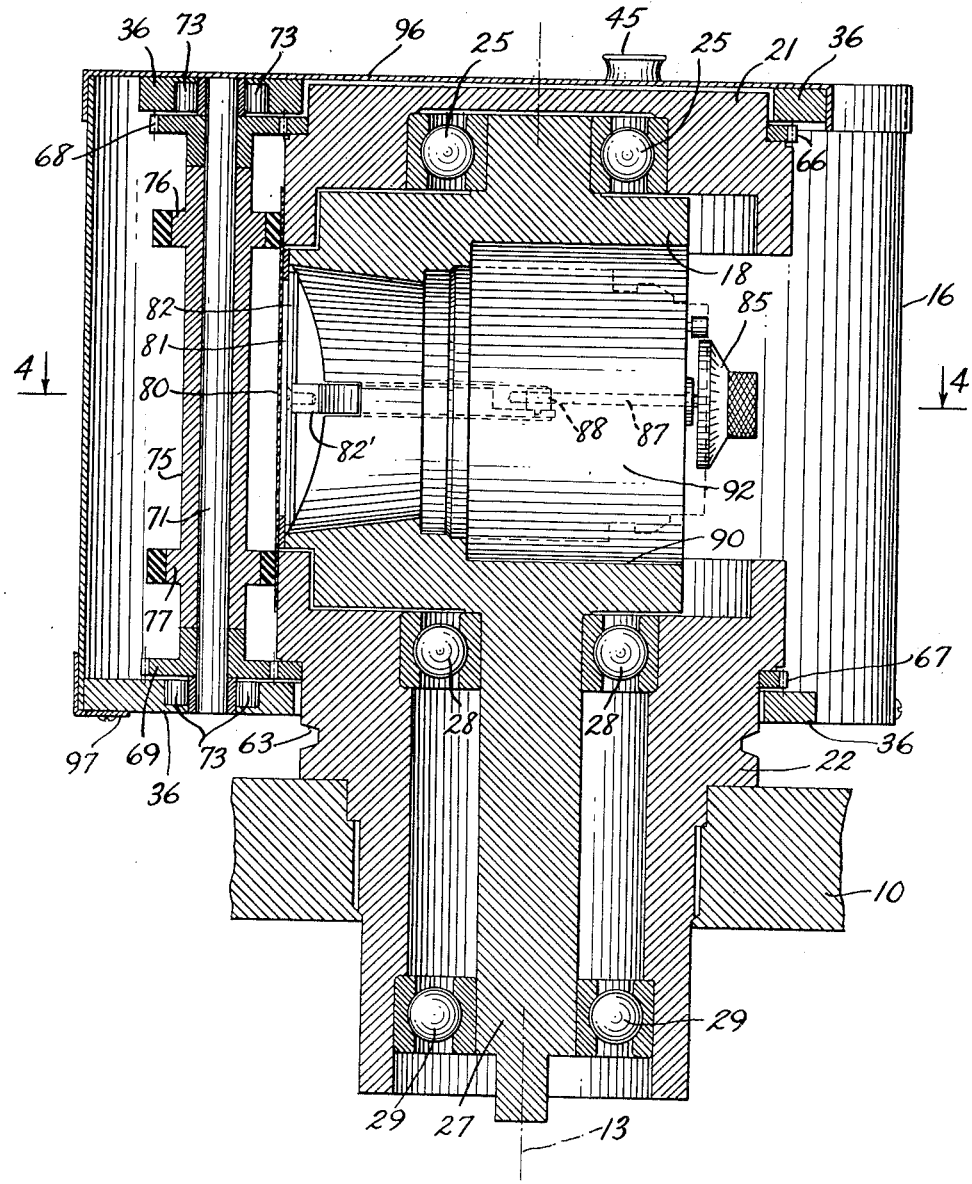
Figure 3 is a sectional view taken on the line 3—3 of Figure 4.

2 is indicated by the reference character 13 (Fig. 3.)

The housing of the camera is connected with a drive shaft that extends downward into the housing of a motor unit 12 which supplies power for rotating the camera at a uniform rate of speed. This motor unit includes an electric motor 14 with a speed governor and motion transmitting connections that effect a gear reduction so that the camera turns at a much lower speed than the speed of the motor 14. The camera 9 includes a housing 16 which is open at the front to expose a rotatable element 18 that turns in bearings held in fixed cylinders comprising an upper cylinder 21 and a lower cylinder 22.

Figure 2:
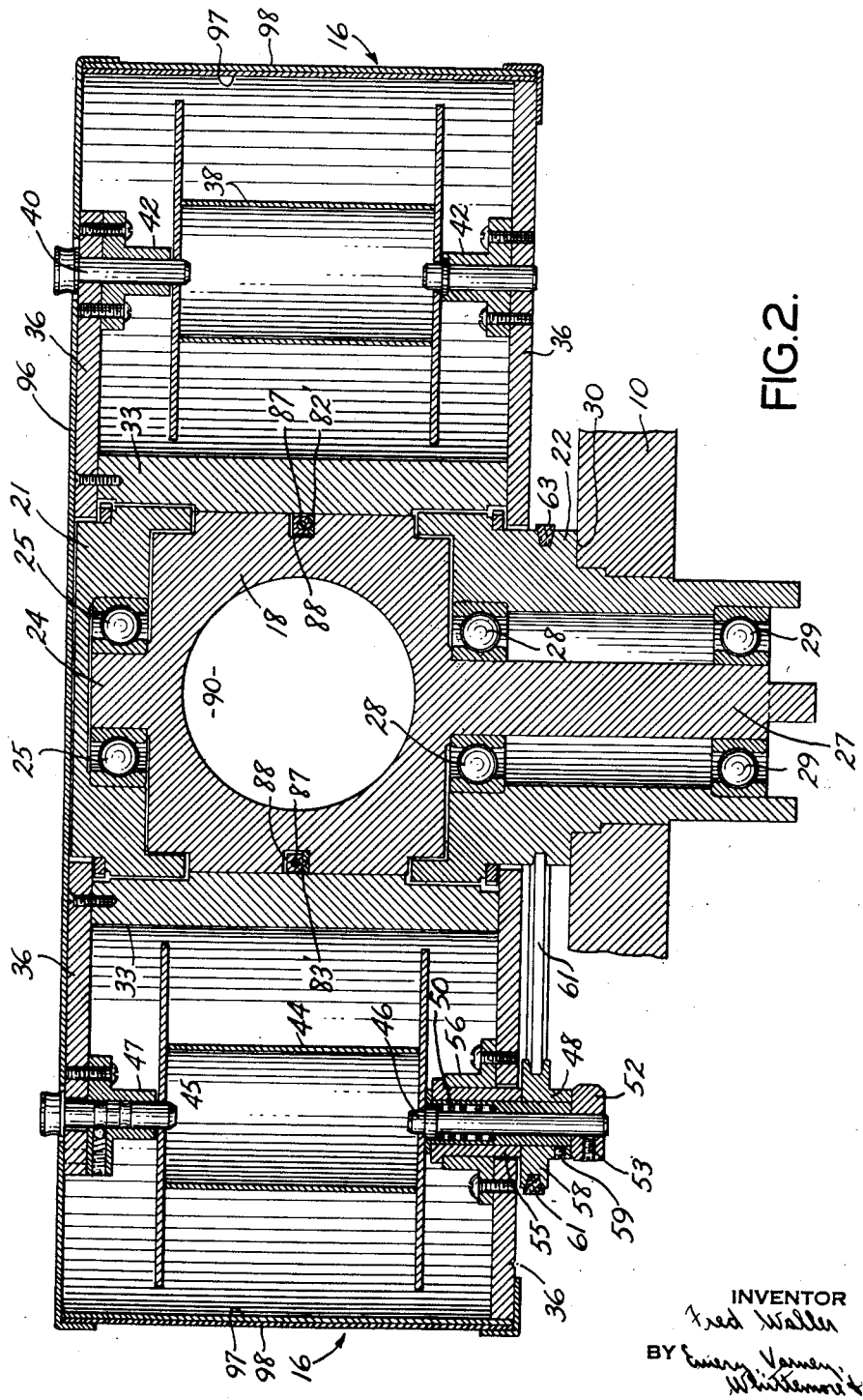
Figure 2 is an enlarged vertical sectional view taken on the line 2—2 of Figure 4, but with the lens barrel removed.

Figure 2 shows this construction in detail. The rotatable element 18 has a short stud shaft 24 turning in ball bearings 25 in the upper fixed cylinder 21. At the lower end of the rotatable element 18 there is a shaft 27 which rotates in ball bearings 28 and 29 held in the lower fixed cylinder 22. It is this shaft 27 that connects the rotatable element 18 with the motor unit 12. A shoulder 30 of the lower cylinder 22 seats against the head 10 of the tripod.

An inner frame 33 of the camera is connected with the rotatable element 18 so as to move as a unit with this rotatable element. A spool supporting frame 36 is connected to the inner frame 33 and extends outwardly from both sides of the inner frame. A film supply spool 38 is held between centers 40 that are carried in bearings 42 secured to the frame 36.

A film take-up spool 44 is held between the centers 45 and 46 carried in a bearing 47, and bearing sleeve 48 connected to the frame 36. The lower center 46 is pressed against the bottom flange of the take-up spool 44 by a spring 50.

The lower portion of the center 46 extends downward beyond the end of the bearing sleeve 48 and there is a collar 52 secured to it by a set screw 53.

The sleeve 48 rotates in a bushing 55 which is carried in a bracket 56 secured to the frame 36. A pulley 58 is connected to the sleeve 48 by a set screw 59 and this pulley 58 is driven by a belt 61 that runs in a groove 63 in the lower fixed cylinder 22 of the camera. As the camera rotates about the axis 13 of the shaft 27, the pulley 58 describes an orbit around the fixed cylinder 22 and the belt 61 causes the pulley 58 to rotate in a direction to wrap the film on the take-up spool 44. The diameter of the pulley 58 is substantially smaller than the diameter of the groove 63 so that the pulley 58 turns at a speed at least as fast as is necessary to maintain a tension on the film when the coil of film on the take-up spool 44 has its minimum diameter.

The spring 50 holds the upper face of the collar 52 in contact with the lower face of the hub of pulley 58, and these faces comprise a friction clutch through which rotation of the pulley 58 is transmitted to the center 46. This friction maintains a constant tension on the film, but slippage of the clutch permits the take-up spool to turn at a progressively slower speed as the diameter of the coil of film on the spool 44 increases.

Figure 3 illustrates the way in which the upper cylinder 21 is held fixed in space during the rotation of the camera. This upper cylinder 21 is supported from the rotatable element 18 by the ball bearings 25 which permit free relative rotation of the rotating member 18 and the upper cylinder 21. A connection is provided between the upper cylinder 21 and the lower fixed cylinder 22 for preventing the upper cylinder from turning when the rotatable element 18 turns. In the illustrated embodiment of the invention, this connection is a gear train.

There is a gear 66 rigidly connected to the upper cylinder 21 and a similar gear 67 rigidly connected with the lower cylinder 22. These gears 66 and 67 mesh with pinion gears 68 and 69 respectively. The pinion gears 68 and 69 are secured to a jack shaft 71 that turns in bearings 73 carried by the frame of the camera. The gears 66 and 67 are of the same pitch diameter, and the gear 68 is of the same pitch diameter as the gear 69.

With this combination, the gear 69 rolls around the gear 67 as the camera rotates, and this imparts rotation to the shaft 71 and gear 68. Because of the fact that the gears 67 and 69 have the same ratio to one another as the gears 66 and 68, and because of the fact that the gear 67 is stationary, the rotation of the gear 68 will exactly offset the rotation of the camera and hold the gear 67 and upper cylinder 21 stationary.

The gears 68 and 69 connected by the shaft 71 are, therefore, connections that are offset from the axis of the cylinders 21 and 22 and that react against the first gear 61 of the lower cylinder to hold the gear 66 and its upper cylinder 21 stationary during rotation of the camera about its axes.

The gear train comprising the gears 66, 67, 68 and 69 is preferably of such construction that it is substantially free of back lash. Lashless gears or other known expediencies can be used for eliminating play in the gearing connection between the cylinders 21 and 22.

The upper cylinder 21 would be held stationary by contact with the film even though there were no connection between it and the lower fixed cylinder 22. The gearing has the advantage, however, that it holds the upper cylinder 21 stationary even though there is apparatus associated with the upper cylinder for notching the film at the end of each revolution of the camera.

The jack shaft 71 also carries a sleeve 75 which has rollers 76 and 77 near its opposite ends. These rollers 76 and 77 have peripheral rubber faces that hold a film 80 against the upper and lower cylinders 21 and 22. The camera can be made with the lower fixed cylinder 22 and without the upper fixed cylinder 21, but better support for the film is provided by having the fixed cylindrical surfaces at both the upper and lower edge portions of the film.

Figure 4:
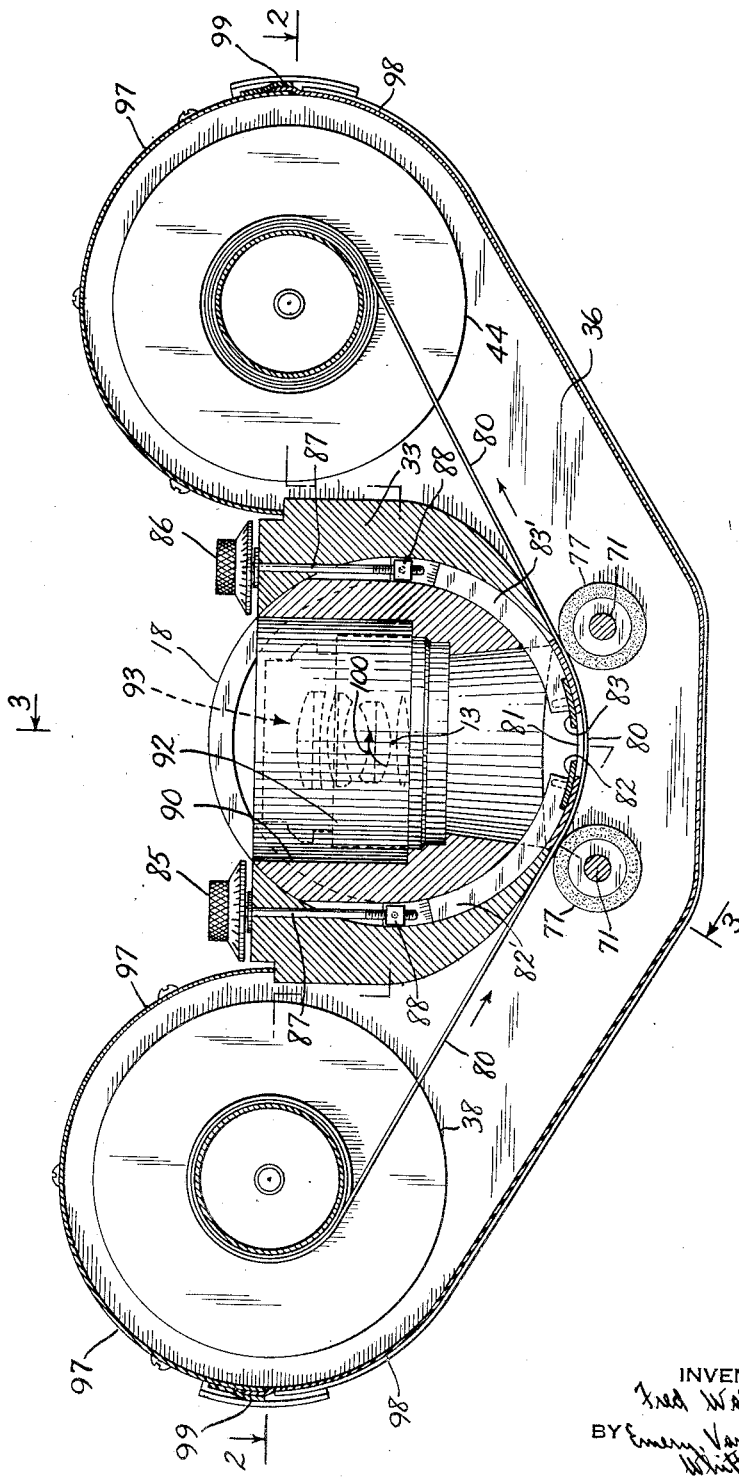
Figure 4 is a horizontal sectional view taken on the line 4—4 of Figure 3.

There are two jack shafts 71 which are of similar construction and carry the same gears and rollers. The relative positions of the jack shafts 71 with respect to one another and with respect to the portion of the film that is being exposed, are shown in Figure 4. The inner frame 33 of the camera is constructed with a long vertical slot 81 immediately in front of the film. This slot 81 comprises the film gate for the camera.

For reasons that will be explained, it is advantageous to mask the slot 81 and obtain a variable width of slit through which the light passes to the film. In order to provide such a slit at the film gate, there are mask elements 82 and 83 supported by the frame and movable toward and from one another. These mask elements 82 and 83 are supported from slides 82' and 83' extending along circumferential slots in the rotatable element 18. These slides are movable far enough to permit movement of the mask elements between positions where they expose the full width of the slot 81 and other positions that reduce the open width of the slot to a value of substantially zero.

The mask elements 82 and 83 are shifted toward and from one another by knobs 85 and 86, respectively, located at the front of the camera and connected with screws 87 in the frame that thread through lugs 88 projecting up from the slides 82' and 83', for effecting finely graduated and accurate control of the slit width adjustments.

There is an opening 90 through the rotatable element 18, and this opening serves as the lens mount of the camera. A lens barrel 92 is held in the rotatable element 18 and is adjustable in the opening 90 to change the focus of the camera. The lens barrel is so located that the second principal point of the lens is on the axis of rotation 13 of the camera when the lens is focused for infinity. The lens in the barrel 92 comprises a number of separate lens elements, in accordance with conventional practice, as indicated in dotted lines, and this lens is indicated generally by the reference character 93.

The radius of the fixed cylinders 21 and 22 (Fig. 3) against which the film is pressed by the rollers 76 and 77, and the radius of the portions of the frame 33 at opposite sides of the film gate, are substantially equal to the focal length of the lens in the lens mount 92. The film 80 at the gate is, therefore, at the focal surface of the lens.

There is a limit to the area of the cylindrical film surface on which the image is stationary because the cylindrical surface departs from a plane. This consideration determines the maximum opening of the scanning aperture or slit provided between the mask elements 82 and 83. The width of the slit between the mask elements 82 and 83 determines the area of film exposed at one time. The width of the slit is reduced when the light is strong and it becomes desirable to reduce the exposure of the film.

The exposure is also controlled by regulating the lens stop and the speed of rotation. The camera may or may not have a shutter since the lens must remain open during the entire angular movement of the camera. A cover that fits the end of the lens mount can be used to prevent entrance of light into the lens when the camera is not moving, if no other shutter is provided.

The proper limit for the width of the slit depends upon the radius of the cylinder around which the film is bent, and upon the depth of focus of the lens which in turn depends upon the F/No. of the lens and the degree of sharpness required. Optical deficiencies of the lens which may further limit the depth of the field also have a limiting effect, since the camera is theoretically correct for only one object distance. Objects which differ in distance by appreciable amounts from the theoretically correct distances show slight image movement which can be limited by reducing the slit width sufficiently so as not to destroy the sharpness of the picture. Experience has shown that a camera using an F/1.9-50 mm. lens, and a slit width of 5/8", is satisfactory at full aperture for distance objects. For other object distances down to 6', the full slit width has been satisfactory, if the lens aperture is sufficiently stopped down to compensate for the increased depth of the field. These figures are given merely by way of illustration.

The casing of the camera includes a top wall 96 (Fig. 2), side wall 97 (Fig. 4), and a back 98 which is removable from the rest of the side wall along joints 99 for loading and unloading the camera.

In the operation of the camera, the rotatable element 18, in which the lens 93 is carried, turns as a unit with the camera casing about the axis 13 and in the direction indicated by the arrow 100. The film passes from the supply spool 38 to the take-up spool 44. A portion of the film is bent around the fixed cylinders 21 and 22 to give the film a cylindrical shape about the axis 13 and this portion of the film is stationary while the camera rotates. The rotary motion of the camera, however, causes the take-up spool 44 to advance on the instantaneously stationary portion of the film so as to unwrap it from the fixed cylinders 21 and 22 about which it is bent. At the same time, the retreating movement of the supply spool 38 wraps new film around the fixed cylinders 21 and 22 so that there is always a portion of film of the same angular extent which is stationary while held against the stationary cylinders 21 and 22 at its upper and lower edge portions.

Since the rotatable element 18, which carries the lens 93, turns at the same speed and as a unit with the camera housing, the slit and film gate moves so as to be always in front of the stationary portion of the film. It will be evident, therefore, that the camera can be used to make a panoramic picture up to 360°; and the camera can make panoramic pictures in excess of 360° if there is any purpose in repeating a portion of the image on the film. It will be evident, also, that the camera can be used for taking a number of different panoramic pictures on the same roll of film.

The preferred embodiment of the invention has been illustrated and described but changes and modifications can be made and some features of the invention can be used in different combinations without departing from the invention as defined in the claims.

What is claimed is:

1. A panoramic camera comprising a housing, a bearing on which the housing is rotatable about an axis, a lens mount supporting a lens with the second principal point of the lens on the axis of rotation of the housing and with the axis of the lens substantially normal to said axis of rotation, cylinders spaced from one another and at least partially enclosed within the housing, said cylinders having their axes substantially coincident with the axis of rotation of the housing, means for holding said cylinders stationary, with respect to the bearing on which the housing is rotatable, during the rotation of the housing, apparatus that holds the film against the cylinders with the film wrapped around a predetermined angular extent of the cylinders, a supply spool from which successive portions of the film are progressively supplied to said stationary cylinders at one side of said angular extent, and a take-up spool on which film is progressively wrapped from the other side of said angular extent, during rotation of the housing, both of the spools being carried by the housing and movable therewith about the axis of rotation.

2. A panoramic camera comprising a support, a housing rotatable on said support and about an axis, upper and lower cylinders in the housing on a common axis that is coincident with the axis of rotation of the housing, said cylinders being spaced from one another by a distance somewhat less than the width of the film with which the camera is intended to be used, peripheral surfaces on the cylinders in position to contact with the upper and lower edge portions of the film, apparatus that holds the film stationary against said peripheral surfaces as the camera rotates about its axis, a device that connects the lower cylinder with the support for holding the lower cylinder stationary while the camera rotates about its axis, and a shaft carried by the housing and located at a distance from the axis of rotation, driving connections operatively connecting the shaft with the lower cylinder for rotating the shaft as the housing moves around the lower cylinder, and motion transmitting connections between the shaft and the upper cylinder having a mechanical advantage that turns the upper cylinder with respect to the housing at a rate that compensates for the rotation of the housing so that the upper cylinder remains stationary with respect to the lower cylinder.

3. A panoramic camera comprising a lower stationary cylinder for rigidly connecting with a tripod head, a rotatable element including a portion carried in bearings in the lower cylinder for rotation about the axis of said cylinder, a camera housing connected with the rotatable element about the axis of said cylinder for rotation as a unit with said element, another cylinder at the upper end of the rotatable element with an axis coincident with the axis of the lower cylinder, the lower and upper cylinders having peripheral portions enclosed within the housing and in position to contact with the lower and upper edge portions of a film, apparatus that holds the film stationary and against said peripheral portions of the cylinders for a limited angular extent of the cylinders, there being an optical opening through the rotatable element in front of the portion of the film that contacts with the lower and upper cylinders, a lens mount for holding a lens with its second principal point on the axis of the cylinders and with the axis of the lens at right angles to the axis of said cylinders, and other apparatus that lays new film down progressively on portions of said cylinders within the housing toward one side of the lens mount and that winds up the film progressively from portions of said cylinders within the housing on the other side of the lens mount.

4. A panoramic camera including a housing, a support on which the housing is rotatable about an axis, a lens mount carried by the housing in position to support a lens with a principal point of the lens on the axis of rotation of the housing and with the lens axis at right angles to said axis of rotation, an upper cylinder located above the lens mount and at least partially enclosed within the housing and having its axis substantially coincident with said axis of rotation, a lower cylinder located below the lens mount and at least partially enclosed within the housing and having its axis substantially coincident with said axis of rotation, each of the cylinders having a radius substantially equal to the focal length of the lens with which the camera is intended to be used, apparatus that holds the upper and lower edge portions of the film against said cylinders, and other apparatus that lays new film down progressively on portions of said cylinders within the housing toward one side of the lens mount and that winds up the film progressively from portions of said cylinders within the housing on the other side of the lens mount.

5. A panoramic camera including a housing with a support on which the housing is rotatable about an axis, a film guide around which a portion of the film is bent to a concave form having an axis of curvature substantially coincident with the axis of rotation of the housing, the housing having an optical opening in front of the film for admitting light to expose the film, a film gate connected with the housing and movable as a unit with the housing, said film gate including adjustable masking elements, bearings along which the masking elements are movable on curved paths that have their centers of curvature substantially coincident with the axis of rotation of the housing toward and from one another to change the width of the film gate, and a device for moving the masking elements toward and from one another, along said curved paths.

6. A panorama camera comprising a housing that is rotatable about an axis, upper and lower cylinders in the housing with axes coincident with the axis of rotation of the housing, the upper and lower cylinders being spaced from one another by a distance somewhat less than the width of the film with which the camera is intended to be used, and each of said cylinders having a zone of its peripheral surface in position to bear against the edge regions of the portion of the film that is being exposed, each of said cylinders also having gear teeth around its periphery beyond the zones of the cylinders that contact with the film, a connection for holding the lower cylinder stationary during rotation of the camera housing, a shaft extending parallel to the axis of rotation, bearings in which the shaft turns, and gears on the shaft in position to mesh with the gear teeth of the upper and lower cylinders for holding the upper cylinder stationary during rotation of the housing.

7. A panoramic camera including a housing that encloses film spools and that has a support on which the housing is rotatable about an axis, a lens mount having a longitudinal axis at a central region of the front of the camera housing, a film guide at least a portion of which is stationary with respect to said support the stationary portion having curved surfaces that are separate and spaced from one another and that bend the film along its length to a substantially cylindrical shape with its axis of curvature on the side toward the axis of rotation of the housing, the stationary curved surfaces including one located above the axis of the lens mount and another located below said axis of the lens mount, both of said surfaces having at least their rearward portions enclosed within the housing for all positions of the housing as it rotates to take a panorama picture, film spool supports within the camera housing, apparatus that progressively lays successive portions of the film into stationary contact with the rearward portions of the curved surfaces as the housing rotates, said apparatus including a film supply spool located on one side of the housing and movable with the housing and that unwinds to leave a continuous length of the film on the rearward portions of said curved surfaces as the housing rotates, and a take-up spool located on the other side of the housing and movable with the housing and that winds up film progressively from the curved surfaces as the housing rotates.

8. A panoramic camera as described in claim 7 with the lens mount located in position to support a lens with the principal point of the lens in alinement with the axis of rotation of the housing, and in which the curved surfaces of the film guide have a radius of curvature substantially equal to the focal length of the lens, and their centers of curvature in substantial alinement with the axis of rotation of the housing.

9. A panoramic camera as described in claim 7 with a film gate located between the rearward portions of the curved surfaces of the film guide at a location behind the lens mount, and connections between the film gate and the housing to move the film gate as a unit with the housing as the housing rotates, the film gate comprising opposite edge portions with means for adjusting them toward and from one another to control the exposure of the camera.

FRED WALLER.

REFERENCES CITED

The following references are of record in the file of this patent:

UNITED STATES PATENTS

| Number | Name | Date |
|---|---|---|
| 511,133 | Fretwell | Dec. 19, 1893 |
| 812,163 | Bried | Feb. 6, 1906 |
| 867,396 | Muller | Oct. 1, 1907 |
| 2,129,959 | Pollock | Sept. 13, 1938 |